US006497050B1

(12) United States Patent
Ricalde

(10) Patent No.: US 6,497,050 B1
(45) Date of Patent: Dec. 24, 2002

(54) TAPE MEASURE APPARATUS WHICH CAN BE USED AS A MARKING GAUGE AND/OR COMPASS

(76) Inventor: Paul Ricalde, 60 Schill Ave., Kenner, LA (US) 70065

( * ) Notice: Subject to any disclaimer, the term of this patent is extended or adjusted under 35 U.S.C. 154(b) by 0 days.

(21) Appl. No.: 09/561,062

(22) Filed: Apr. 28, 2000

(51) Int. Cl.$^7$ .............................. G01B 3/10; B25H 7/04
(52) U.S. Cl. ............................ 33/770; 33/759; 33/768; 33/668
(58) Field of Search .................. 33/770, 755, 757, 33/758, 759, 761, 768, 27.02, 27.03, 27.031, 27.032, 42, 668

(56) References Cited

U.S. PATENT DOCUMENTS

| | | | | |
|---|---|---|---|---|
| 2,549,503 A | * | 4/1951 | McCully ........................ 33/760 |
| 2,624,120 A | | 1/1953 | Mills |
| 2,649,787 A | * | 8/1953 | Kobayashi ................... 33/668 |
| 2,934,827 A | * | 5/1960 | Barto ........................ 33/27.03 |
| 3,526,964 A | | 9/1970 | Clark, Jr. |
| 3,744,134 A | * | 7/1973 | Zima, Jr. ..................... 33/768 |
| 3,745,663 A | * | 7/1973 | Dodge ........................ 33/759 |
| 3,823,481 A | | 7/1974 | Chapin |
| 4,023,277 A | | 5/1977 | Fizer |
| 4,574,486 A | | 3/1986 | Drechsler |
| 4,827,622 A | * | 5/1989 | Makar ........................ 33/770 |
| 4,890,393 A | * | 1/1990 | St. Jean ...................... 33/768 |
| 4,949,462 A | * | 8/1990 | Spencer ....................... 33/42 |
| 4,999,924 A | * | 3/1991 | Shields ....................... 33/770 |
| 5,016,360 A | * | 5/1991 | Starcevich ................... 33/758 |
| 5,134,784 A | | 8/1992 | Atienza |
| 5,172,486 A | | 12/1992 | Waldherr |
| 5,189,801 A | * | 3/1993 | Nicely ........................ 33/42 |
| 5,295,308 A | * | 3/1994 | Stevens et al. ............... 33/42 |
| 5,379,524 A | | 1/1995 | Dawson |
| 5,390,426 A | | 2/1995 | Hull |
| 5,421,100 A | | 6/1995 | Leore |
| 5,430,952 A | | 7/1995 | Betts |
| 5,481,810 A | | 1/1996 | Hastings et al. |
| 5,606,803 A | | 3/1997 | O'Sullivan |
| 5,815,940 A | * | 10/1998 | Valentine, Sr. ............... 33/770 |
| 5,842,284 A | | 12/1998 | Goldman |
| 6,032,379 A | | 3/2000 | Usami |
| 6,041,513 A | | 3/2000 | Doak |

* cited by examiner

Primary Examiner—Christopher W. Fulton
Assistant Examiner—Madeline Gonzalez
(74) Attorney, Agent, or Firm—Garvey, Smith, Nehrbass & Doody, L.L.C.; Brett A. North

(57) ABSTRACT

An improved tape measure apparatus which can be used as a marking gauge and/or compass comprising a tape measure, an insert comprising a base, a guide rigidly attached to the base and generally parallel to graduated indicia markings of the rule blade when extended from the tape measure whereby the graduated markings of the tape measure's rule blade may be read. An alternative embodiment includes an insert enabling standard tape measures to be used as marking gauges and/or compasses.

27 Claims, 5 Drawing Sheets

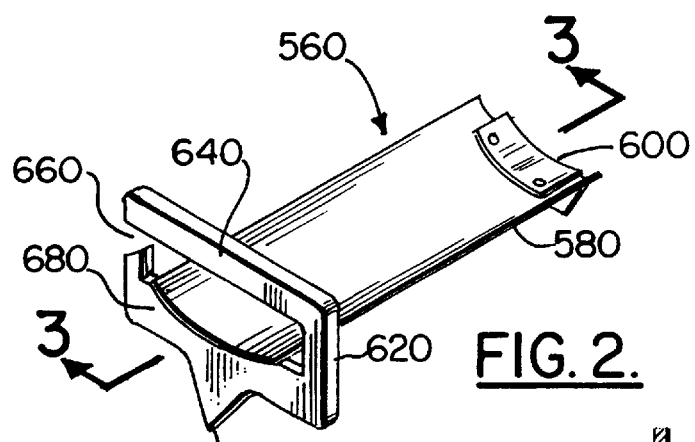
FIG. 2.
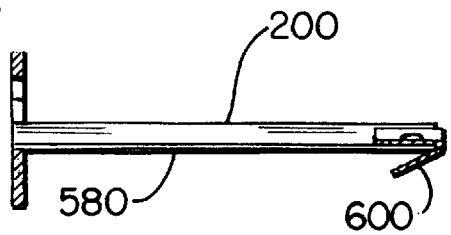
FIG. 3.
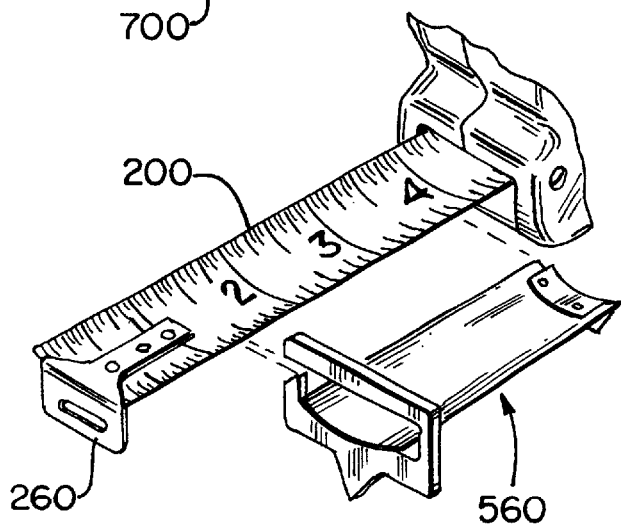
FIG. 1.
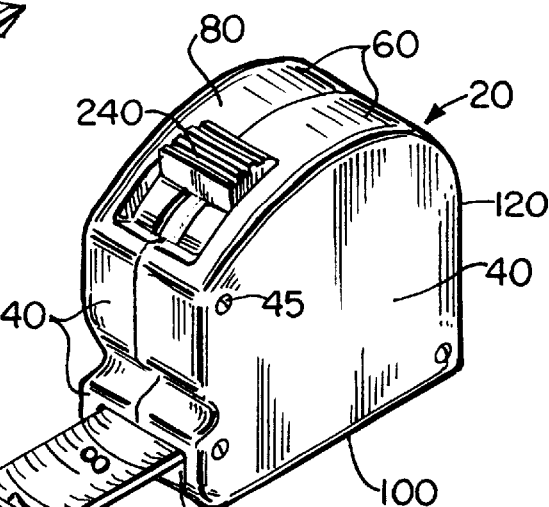
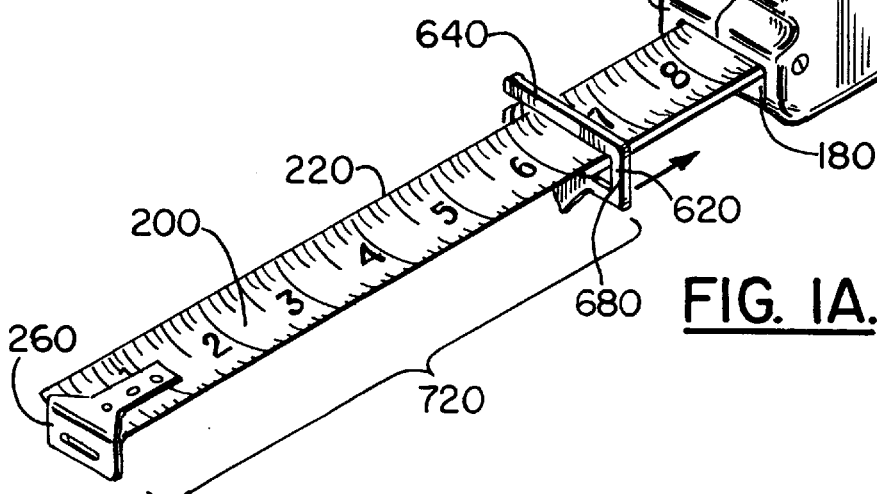
FIG. 1A.

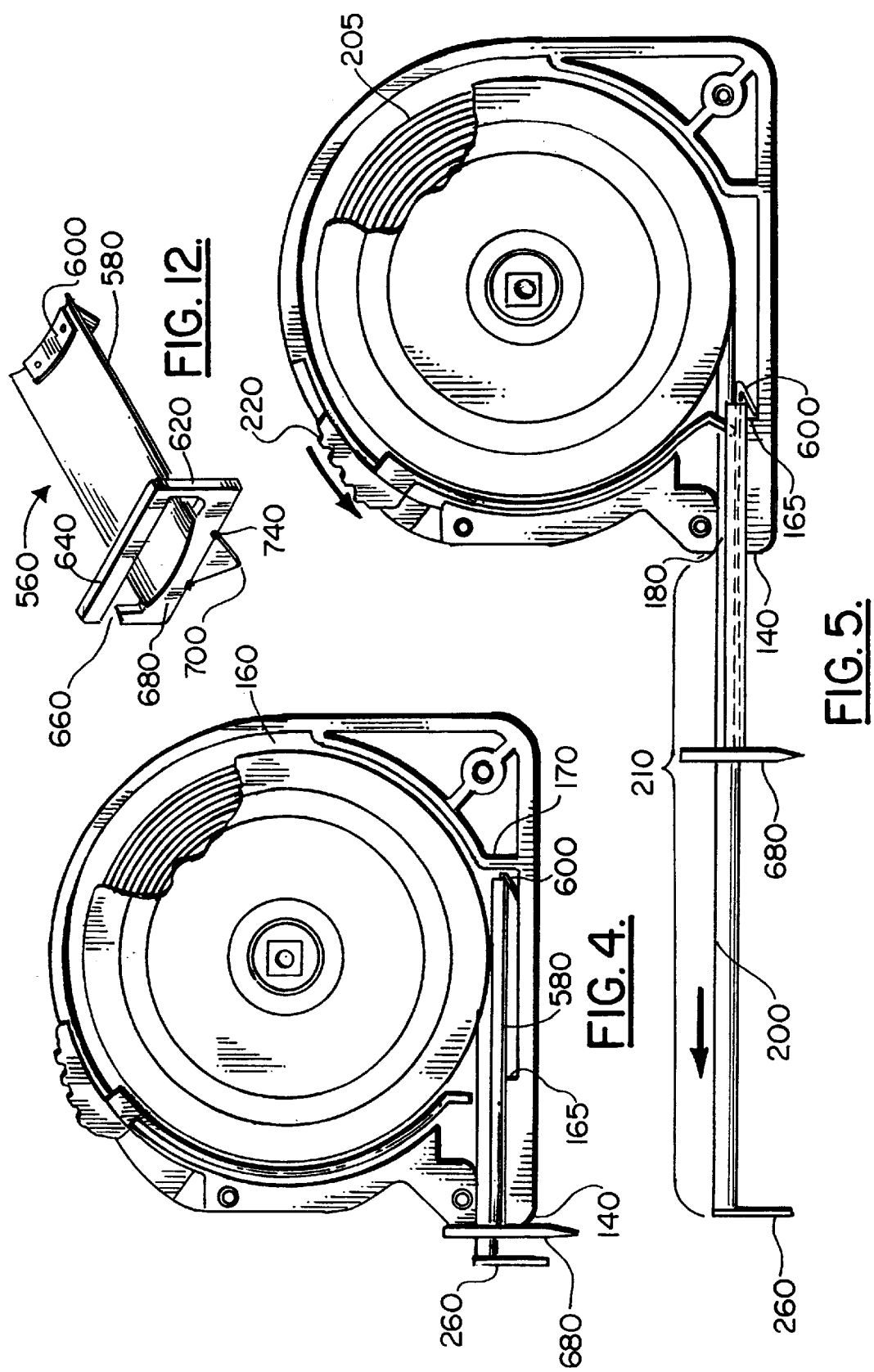

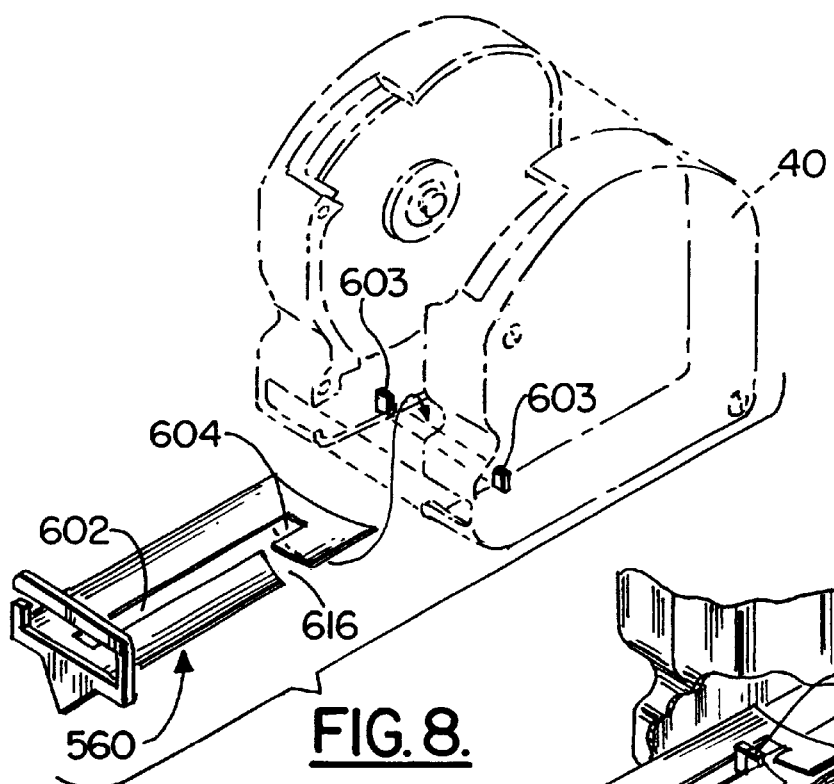
FIG. 8.
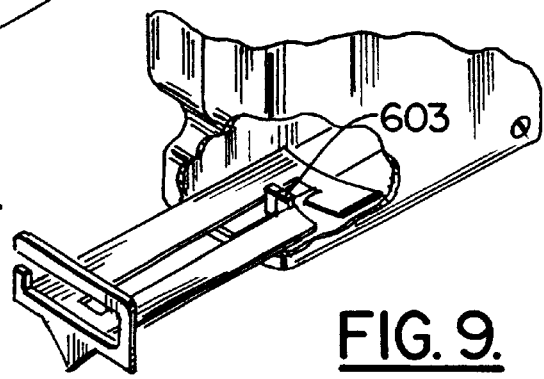
FIG. 9.
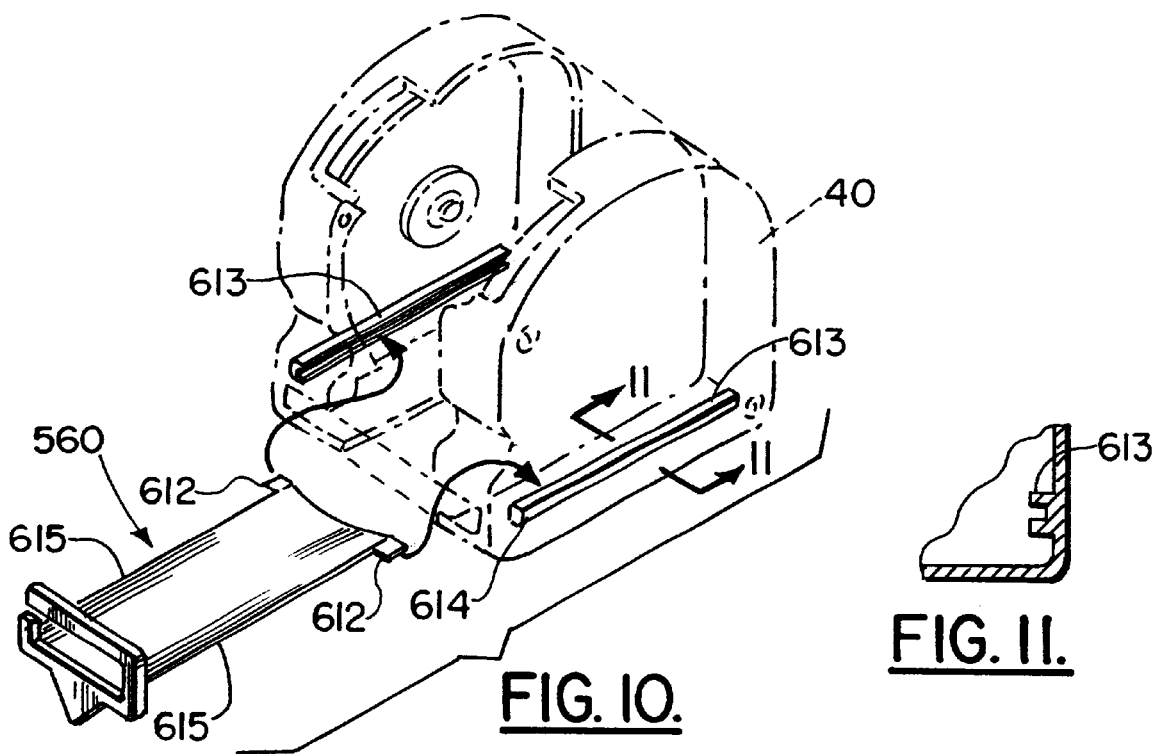
FIG. 10.
FIG. 11.

TAPE MEASURE APPARATUS WHICH CAN BE USED AS A MARKING GAUGE AND/OR COMPASS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates generally to carpentry tools and, more specifically, to an improved tape measure apparatus which can be used as a marking gauge and/or compass.

2. General Background of the Invention

Standard tape measures include a length of tape wound on a spool with a spring return mechanism so that after the tape is taken out of a housing, the spring return mechanism automatically retracts the tape into the housing. A locking mechanism, typically a sliding button, locks the tape for the purpose of reading the length of the deployed tape.

Numerous tape measures have been provided in prior art. For example, U.S. Pat. No. 2,624,120 to Mills; U.S. Pat. No. 4,574,486 to Drechsler; and U.S. Pat. No. 5,390,426 to Hull are illustrative of the prior art and incorporated herein by reference to show the conventional construction of tape measures. While these units may be suitable for the particular purpose to which they address, they would not be as suitable for the purposes of the present invention as heretofore described. Tape measures are well adapted for measuring distances but their utility is usually restricted to this single function.

Many instances arise where workpieces must be scribed at uniform distances or have arcs or circles marked thereupon. In these instances tools such as marking gauges and compasses are required in addition to standard tape measures.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY OF THE INVENTION

The apparatus of the present invention solves the problems confronted in the art in a simple and straightforward manner. What is provided in one embodiment is an adapter for tape measures which, after insertion, enables standard tape measures to be used as marking gauges and/or compasses. Another embodiment includes a tape measure apparatus with the casing being redesigned and/or adapted to include an insert that enables the tape measure to be used as a marking gauge and/or compass.

An object of the present invention is to provide a tape measure with insert which can be used in combination with a marking/cutting tool, such as a pencil or knife, to make a mark, score or cut line at a measured distance on a workpiece.

An alternative object of the present invention is to provide a tape measure with insert which can also be used in combination with a marking/cutting tool, such as a pencil or knife, to make a mark, score or cut line on a workpiece in the shape of an arc or circle and measured radius.

An additional object of the present invention is to provide a tape measure with insert which protects the finger of the person using the tape measure and insert as a marking gauge to make a mark, score or cut line.

An additional object of the present invention is to provide a tape measure with insert which allows the user to grip the extended portion of the rule blade lying on top of the insert and thereby stabilize the tape measure and insert during use as a marking gauge.

An additional object of the present invention is to provide a tape measure and insert whereby the insert fits into the tape measure casing to minimize the overall change in dimension of the tape measure's casing when the insert is not being used.

A further object of the present invention is to provide a tape measure with insert that is simple and easy to use as a marking gauge or compass.

A still further object of the present invention is to provide an insert for a standard tape measure that is economical in cost to manufacture.

A still further object of the present invention is to provide a tape measure and insert combination which can be used in combination with a marking/cutting tool, such as a pencil or knife, to make a mark, score or cut line at a measured distance on a workpiece.

Further objects of the present invention will appear as the description proceeds.

For a further understanding of the nature, objects, and advantages of the present invention, reference should be had to the following detailed description, read in conjunction with the following drawings, wherein like reference numerals denote like elements. However, the drawings are illustrative only, and changes may be made in the specific construction illustrated and described within the scope of the appended claims.

BRIEF DESCRIPTION OF THE SEVERAL VIEWS OF THE DRAWINGS

FIG. 1 is a perspective view of a preferred embodiment of the apparatus of the present invention;

FIG. 1A is a perspective view with the insert installed in the tape measure casing;

FIG. 2 is a perspective view of a preferred embodiment of the insert;

FIG. 3 is a side view of a preferred embodiment of the insert;

FIG. 4 is a side view of the insert and tape measure wherein the insert is positioned inside the casing of the tape measure;

FIG. 5 is a side view of the insert and tape measure wherein the insert is extended from the casing of the tape measure;

FIG. 8 shows an insert and tape measure wherein the insert includes a slot which slidably engages a pin mounted in the tape measure's casing;

FIG. 9 shows a cutout of the insert and tape measure wherein the insert includes a slot which slidably engages a pin mounted in the tape measure's casing;

FIG. 10 shows an insert and tape measure wherein the insert includes pins which slidably engage tracks in the tape measure's casing.

FIG. 11 shows a cutout of the tape measure casing wherein the casing includes tracks which slidably engage pins of the insert.

FIG. 12 show a perspective view of an insert with the guide having a pivoting point.

DETAILED DESCRIPTION OF THE INVENTION

Figure 6:
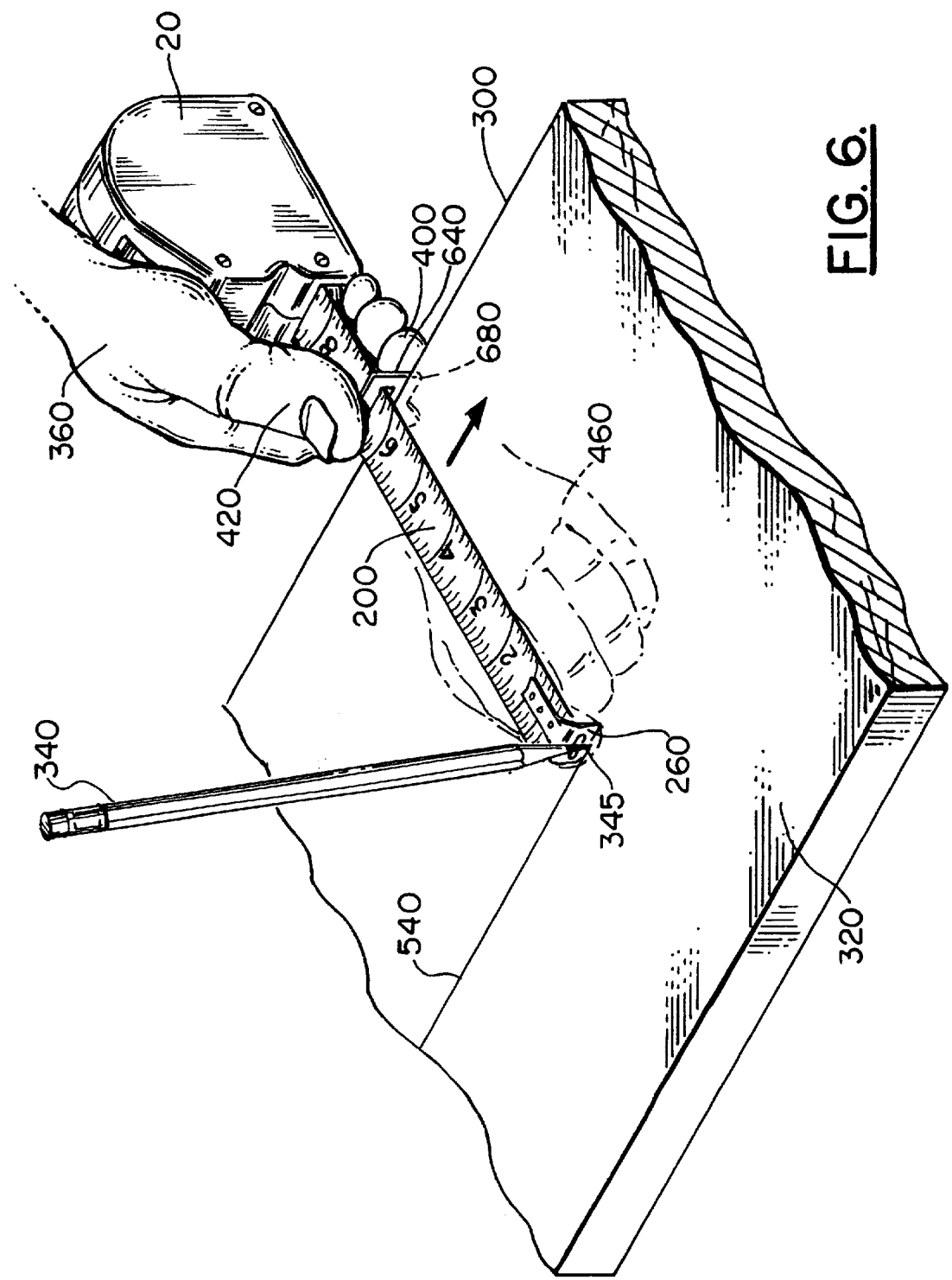
FIG. 6 shows a tape measure with insert being used in combination with a pencil to make a mark or cut line on a workpiece.
Figure 7:
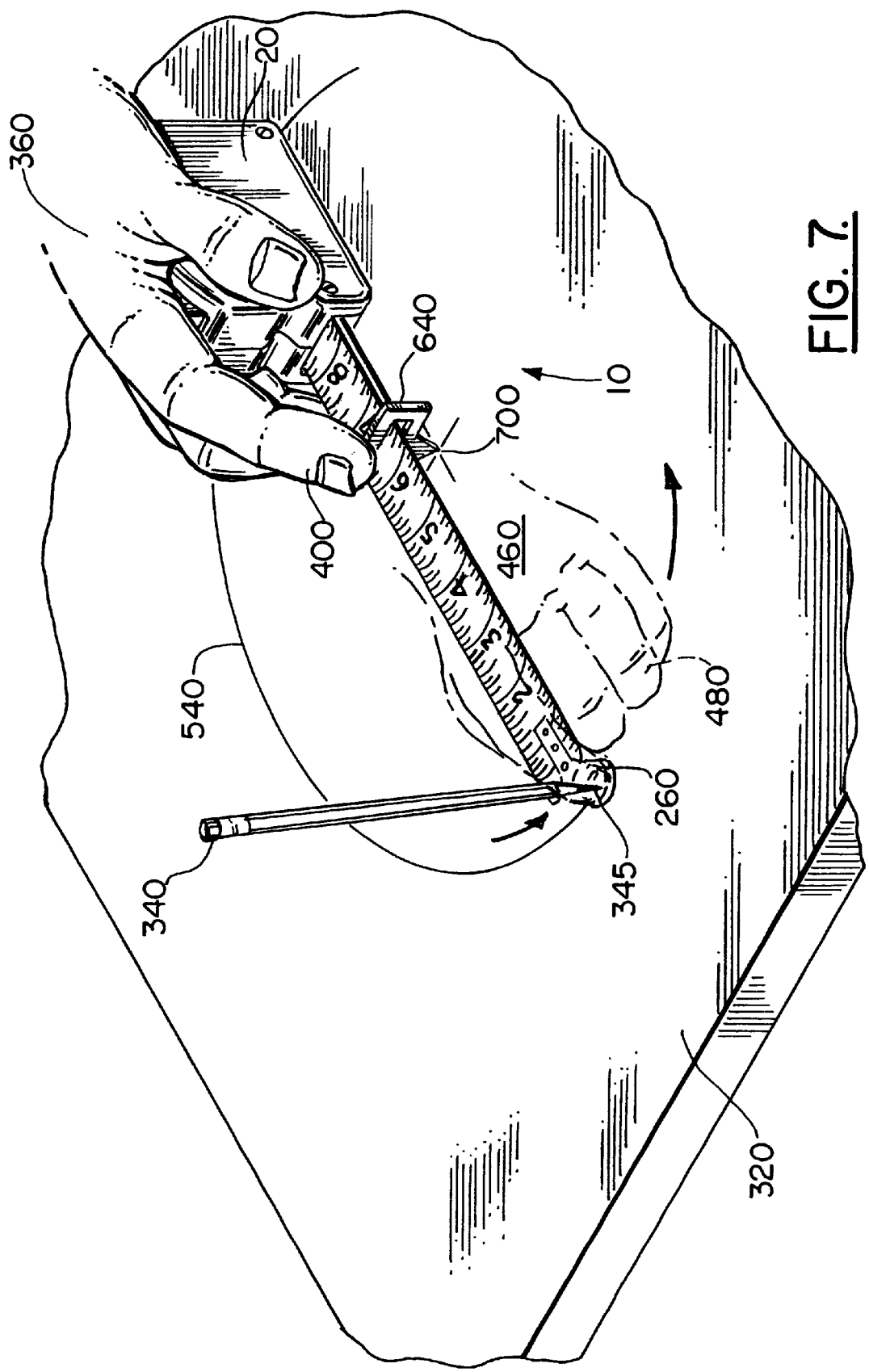
FIG. 7 shows a tape measure with insert being used in combination with a pencil to make an arc or circle on a workpiece.

FIGS. 1 through 6 show a preferred embodiment of the apparatus of the present invention, designated generally by the numeral 10 in FIGS. 1, 1A, 4 and 5. FIGS. 1 through 5 illustrate tape measure apparatus 10 which can include a conventional type tape measure 20 comprising a casing 40 having two side walls 60, a top wall 80, a bottom wall 100, a rear wall 120 and a front wall 140 defining enclosure 160. Front wall 140 has a rule blade aperture 180 adjacent to bottom wall 100. Rule blade 200 is normally retractably stored in a coiled condition within enclosure 160 of casing 40. An inner end 205 of rule blade 200 is secured within enclosure 160, while an outer end 210 of rule blade 200 protrudes through blade aperture 180 in casing 40. Graduated indicia markings 220 along the length of the rule blade 200 frictions as a measuring scale.

A lock and automatic rewind switch 240 can be carried on top wall 80 or front wall 140 of casing 40, to keep a portion of rule blade 200 in an extended locked position through blade aperture 180 in casing 40. Rule blade 200 is elongated, slightly concave and fabricated out of a substantially strong, durable and flexible material. Switch 240 is manually operated to retract rule blade 200 into enclosure 160 of casing 40. End hook 260 is attached to outer end 210 of rule blade 200. End hook 260 is adapted to be normally laid over an edge 300 of a workpiece 320 to be measured, such as an item of wood or sheetrock.

An insert 560 has an arcuate base 580 connected to guide 680. The base 580 is constructed so as to follow the slightly concaved arc formed by outer end 210 of rule blade 200 after protruding through aperture 180. Base 580 is attached to guide 680 either rigidly or pivotally. Extending from base 580 is indicator 620 from which the graduated indicia markings 220 of rule blade 200 are read to determine the distance from guide 680 to end hook 260 of rule blade 200. Using such reading a mark, score or cut line 540 of a precise distance can be made. Indicator arm 640 may extend across guide 680 to provide an easier method of reading distance 720. Guide 680 may include point 700.

Catch 600 is attached to the end of base 580 opposing guide 680. Catch 600 should be constructed of a substantially strong, durable and flexible material. Attachment may be by means of screws, rivets, welding, adhesive, or a tongue and groove connection. Catch 600 may also be attached to base 580 through a slot where the top connecting end of catch 600 may be a "T" fitting in said slot (or any connecting means that would allow catch 600 to swivel in relation to base 580) and the bottom of catch 600 opposing complete removal of the insert as the insert is extended from casing 40. Alternatively, catch 600 may be constructed as a single unit with insert base 580.

In an alternative embodiment, slot 602 and pin 603 may be used for the insert and casing. (See FIGS. 8 and 9). In this embodiment, slot 602 slidably engages pin 603 and insert 560 may be extended outside of casing 40 until rear of slot 604 engages pin 603. Pin 603 may be cast as a single piece with one side of casing 40 or as two pieces from both sides of casing 40. Notch 616 may be used to facilitate initial installation of pin 603 in slot 602. Alternatively, pin 603 may be separate from casing 40 and attached through conventional fasteners, such as a screw, rivet, other fastening means, or adhesive. This embodiment may be included as an option by a manufacturer of the improved tape measure apparatus with insert.

In a further alternative embodiment, a pair of pins 612 and pair of tracks 613 may be used. (See FIGS. 10 and 11). Pins 612 slidably engage tracks 613 and insert 560 may be extended outside of casing 40 until pins 612 engage front of tracks 614. Pins 612 can be extended for added stability. Alternatively, tracks 613 may be constructed so that edges of insert base 615 slidably engage tracks 614 without the use of pins 612. These embodiments may be included as an option by a manufacturer of the improved tape measure apparatus with insert.

Point 700 may be rigidly or pivotally attached to insert base 580 or guide 680. In one embodiment point 700 is pivotally attached to guide 680 or base 580. Pivotally attaching point 700 provides the advantage of removing or hiding point 700 when the insert and tape measure is not being used as a compass. Point 700 can also be slidably connected to guide 680 or base 580 and provide the same advantage. Alternatively, point 700 may also be rigidly or pivotally attached to the bottom wall 100 of casing 40.

Point 700, guide 680, indicator 620, indicator arm 640, and insert base 580 may be constructed as a single piece. If constructed as a single piece, slot 660 would be included between indicator arm 640 and guide 680 to allow rule blade 200 to be inserted under indicator arm 640. Another embodiment includes indicator 620 and indicator arm 640 being removably attached to guide 680 by means of standard connectors such as screws, snaps, hinges, or pivots. Other types of attaching assemblages can be utilized, such as rivets, springs or tongues and grooves, not shown in the drawings.

Insert 560 can be installed in a standard tape measure 20. The insert 560 is first placed under rule blade 200 with catch 600 closest to the front wall 140 of casing 40 (see FIG. 1A). Insert 560 and catch 600 is then inserted under rule blade 200 through aperture 180 in casing 40. Aperture 180 may have to be manually widened to allow both insert base 580 and rule blade 200 to slide there through. This may be done by a knife or other cutting tool.

Alternatively, one of the side walls 60 of casing 40 can be opened by removal of casing screws 45. (FIGS. 4 and 5). However, care must be taken not damage the wound up portion of rule blade 200. Once side wall 60 is removed insert 560 can be slid into aperture 180 and under rule blade 200. After so positioning insert 560, side wall 600 is again attached to casing 20 by means of casing screws 45.

Because catch 600 is constructed of a flexible material, during insertion it will bend up towards insert base 580 and slide through aperture 180, entering casing enclosure 160.

After entering casing enclosure 160 catch 600 will bend down and act to prevent insert 560 from being completely pulled out of casing enclosure 160. Insert 560 will slide into casing enclosure 160 until it is stopped by enclosure rear wall 170. The length of insert base 580 can be such that when the enclosure's rear wall 170 stops insert 560, guide 680 should be close, if not touching, front wall 140 of casing (see FIG. 4).

After installation, insert 560 will slide out of casing 20 until catch 600 is stopped by the front wall 165 of enclosure 160. Pulling out insert 560 converts tape measure 20 into a marking gauge and/or compass.

Insert 560 can be removed from tape measure 20 by opening one of the side walls 60 of casing 40 by removal of screws 45. Because catch 600 is constructed of a flexible material, insert 560 may also be removed by pulling guide 680 until it is stopped by catch 600. At such point, guide 680 should be pushed down thereby causing catch 600 to raise relative to front wall of enclosure. At this point, catch 600 can be pulled through casing aperture 180 thereby removing insert 560. Insert 560 can thereby be reinstalled or installed in another tape measure.

While insert 560 and tape measure 20 operate as a marking gauge, guide 680 produces a smooth gliding motion when being moved along edge 300 of workpiece 320, while keeping index finger 400 of second hand 460 away from edge 300. This makes the tape measure and insert steady and eliminates abrasion of index finger 400 preventing index finger 400 from touching edge 300. A marking/cutting tool 340 can be grasped by fingers 480 of second hand 460 of a person, to make a mark, a score or cut line 540 across workpiece 320. The guide 620 of insert 560 protects index finger 400 of first hand 360 of the person holding tape measure 20 while being moved along an edge 300 of workpiece 320 and making the mark, score or cut line 540 across the workpiece 320 with marking/cutting tool 340.

Operation

Marking Gauge

To use insert 560 and tape measure 20 as a marking gauge, the following steps should be taken:

1. Manually release lock and automatic rewind switch 240, to unlock rule blade 200, if the tape measure 20 is provided with a lock and automatic rewind switch 240;
2. Pull guide 680 until it is stopped by catch 600;
3. Grasp insert base 580 and rule blade 200 with thumb 420 and index finger 400 of first hand 360;
4. Butt the guide 680 against edge 300 of workpiece 320.
5. Extend rule blade 200 to the desired length;
6. Place the marking/cutting tool 340 against end hook 260;
7. Hold the marking/cutting tool 340 with the fingers 480 of second hand 460;
8. Move the guide 680 along edge 300 of workpiece 320, so that marking/cutting tool 340 will make a mark, score or cut line 540 across workpiece 320.

Grasping insert base 580 and rule blade 200 enables the user to gain stability while ensuring that rule blade 200 does not move when making mark 540.

Compass

To use insert 560 and tape measure 20 as a compass, the following steps should be taken:

1. Manually release lock and automatic rewind switch 240 to unlock rule blade 200 if tape measure 20 is provided with a lock and automatic rewind switch 240;
2. Pull guide 680 until it is stopped by catch 600;
3. Place point 700 on workpiece 320;
4. Grasp tape measure 20 with first hand 360 placing index finger 400 on top of indicator arm 640;
5. Extend rule blade 200 to the desired length and reset switch 240 to lock;
6. Place the marking/cutting tool 340 against and hock 260;
7. Hold the marking/cutting tool 340 with the fingers 480 of second hand 460 and steady rule blade 200 by placing index finger 400 behind indicator arm 640 and on top of rule blade 200;
8. Rotate tape measure 20 around point 700, so that marking/cutting tool 340 will make an accurate mark, score or cut line 540 on workpiece 320.

Placing index finger 400 on top of rule blade 200, and applying pressure not only stabilizes the apparatus while making the arc or circle, but also ensures the accuracy of the measurement by preventing rule blade 200 from making any movement while making the arc or circle.

It will be understood that each of the elements described above, or two or more together may also find a useful application in other types of methods differing from the type described above.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims:

The following is a list of parts and materials suitable for use in the present invention:

| PARTS LIST FOR REFERENCE NUMERALS | |
|---|---|
| (Part No.) | (Description) |
| 10 | tape measure apparatus |
| 20 | tape measure |
| 40 | casing |
| 45 | casing screws |
| 60 | side wall of casing |
| 80 | top wall of casing |
| 100 | bottom wall of casing |
| 120 | rear wall of casing |
| 140 | front wall of casing |
| 160 | enclosure in casing |
| 165 | front wall of enclosure |
| 170 | rear wall of enclosure |
| 180 | aperture in casing for rule blade |
| 200 | rule blade of tape measure |
| 205 | inner end of rule blade |
| 210 | outer end of rule blade |
| 220 | graduated indicia markings on rule blade |
| 240 | lock and automatic rewind switch of tape measure |
| 260 | end hook of rule blade |
| 280 | work piece |
| 300 | edge of workpiece |
| 320 | top of workpiece |
| 340 | marking/cutting tool (pencil or knife) |
| 345 | tip of marking/cutting tool |
| 360 | first hand |
| 380 | finger of first hand |
| 400 | index finger of first hand |
| 420 | thumb of first hand |
| 460 | second hand |
| 480 | fingers of second hand |
| 540 | mark, score or cut line on workpiece |
| 560 | insert |
| 580 | insert base |

-continued

PARTS LIST FOR REFERENCE NUMERALS

| (Part No.) | (Description) |
|---|---|
| 600 | catch for insert |
| 602 | slot for insert |
| 603 | pin in casing |
| 604 | rear end of slot for insert |
| 612 | pins for insert |
| 613 | tracks in casing |
| 614 | front end of tracks |
| 615 | edges of insert base |
| 616 | notch for slot |
| 620 | indicator for insert |
| 640 | indicator arm |
| 660 | slot |
| 680 | guide for insert |
| 700 | point for insert |
| 720 | distance from indicator to end hook |

Insert 560 may be constructed of metal, plastic, injection molded plastic, wood, or any material which is substantially strong, durable and flexible.

The foregoing embodiments are presented by way of example only; the scope of the present invention is to be limited only by the following claims.

What is claimed is:

1. A tape measure apparatus comprising:
   a) a casing having two side walls, a top wall, a bottom wall, a rear wall and a front wall defining an enclosure, the front wall having a blade aperture adjacent the bottom wall;
   b) a rule blade having inner and outer end portions and being retractably stored in a coiled condition within said enclosure of the casing, the inner end of the rule blade secured within the enclosure, the outer end of the rule blade protruding through the blade aperture when extended during use;
   c) graduated indicia markings along the length of said rule blade, functioning as a measuring scale;
   d) an end hook attached to the outer end of the rule blade;
   e) an insert slidably connected to the casing through the blade aperture and under the rule blade and movable between retracted and extended positions; and
   f) when in the extended position, the bottom side of the insert providing a gripping surface, the insert comprising:
      i) a base;
      ii) a guide attached to the base and generally parallel to the graduated markings of the rule blade, the rule blade being slidable relative to the base when the guide is substantially perpendicular to the base.

2. A tape measure apparatus as recited in claim 1, wherein the rule blade is elongated, slightly concave and fabricated out of a substantially strong, durable and flexible material.

3. A tape measure apparatus as recited in claim 2, wherein the base is slightly concave to substantially match the shape of the rule blade when the blade is extended during use.

4. A tape measure apparatus as recited in claim 3, further comprising an indicator connected to the guide that enables the graduated markings of the rule blade to be read.

5. A tape measure apparatus as recited in claim 4, further comprising an indicator arm attached to the indicator and extending along the length of the guide, generally parallel to the graduated markings of the rule blade.

6. A tape measure apparatus as recited in claim 3, further comprising a point connected to the bottom center of the guide and pointing downward and allowing the insert to be rotated around the point.

7. A tape measure apparatus as recited in claim 3, further comprising a point pivotally connected to the insert base and allowing the insert to be rotated around the point when the point is pointing downward.

8. A tape measure apparatus as recited in claim 3, wherein the guide is fabricated out of a substantially strong, durable and stiff material.

9. A tape measure apparatus comprising:
   a) a casing having two side walls, a top wall, a bottom wall, a rear wall and a front wall defining an enclosure, the front wall having a blade aperture adjacent the bottom wall;
   b) a rule blade having inner and outer end portions and being retractably stored in a coiled condition within said enclosure of the casing, the inner end of the rule blade secured within the enclosure, the outer end of the rule blade protruding through the blade aperture when extended during use, wherein the rule blade is elongated, slightly concave and fabricated out of a substantially strong, durable and flexible material;
   c) graduated indicia markings along the length of said rule blade, functioning as a measuring scale;
   d) an end hook attached to the outer end of the rule blade;
   e) an insert slidably connected to the casing through the blade aperture and under the rule blade and movable between retracted and extended positions; and
   f) when in the extended position, the bottom side of the insert providing a gripping surface, the insert comprising:
      i) a base, wherein the base is slightly concave to substantially match the shape of the rule blade when the blade is extended during use;
      ii) a guide attached to the base and generally parallel to the graduated markings of the rule blade and
   g) a catch attached to the insert base the catch being configured to resist efforts to pull the insert completely out of the casing enclosure.

10. A tape measure apparatus as recited in claim 9, wherein the base, guide, and catch are fabricated out of a single substantially strong and durable material.

11. A tape measure apparatus comprising:
   a) a casing having two side walls, a top wall, a bottom wall, a rear wall and a front wall defining an enclosure, the front wall having a blade aperture adjacent the bottom wall;
   b) a rule blade having inner and outer end portions and being retractably stored in a coiled condition within said enclosure of the casing, the inner end of the rule blade secured within the enclosure, the outer end of the rule blade protruding through the blade aperture when extended during use, wherein the rule blade is elongated, slightly concave and fabricated out of a substantially strong, durable and flexible material;
   c) graduated indicia markings along the length of said rule blade, functioning as a measuring scale;
   d) an end hook attached to the outer end of the rule blade;
   e) an insert slidably connected to the casing through the blade aperture and under the rule blade and movable between retracted and extended positions; and
   f) when in the extended position, the bottom side of the insert providing a gripping surface, the insert comprising:
      i) a base, wherein the base is slightly concave to substantially match the shape of the rule blade when the blade is extended during use;

ii) a guide attached to the base and generally parallel to the graduated markings of the rule blade and g) a slot located in the base and a pin protruding from the bottom wall of the casing, the slot and pin configured to resist efforts to pull the insert completely out of the casing enclosure.

12. A tape measure apparatus comprising:
a) a casing having two side walls, a top wall, a bottom wall, a rear wall and a front wall defining an enclosure, the front wall having a blade aperture adjacent the bottom wall;
b) a rule blade having inner and outer end portions and being retractably stored in a coiled condition within said enclosure of the casing, the inner end of the rule blade secured within the enclosure, the outer end of the rule blade protruding through the blade aperture when extended during use, wherein the rule blade is elongated, slightly concave and fabricated out of a substantially strong, durable and flexible material;
c) graduated indicia markings along the length of said rule blade, functioning as a measuring scale;
d) an end hook attached to the outer end of the rule blade;
e) an insert slidably connected to the casing through the blade aperture and under the rule blade and movable between retracted and extended positions; and
f) when in the extended position, the bottom side of the insert providing a gripping surface, the insert comprising:
  i) a base, wherein the base is slightly concave to substantially match the shape of the rule blade when the blade is extended during use;
  ii) a guide attached to the base and generally parallel to the graduated markings of the rule blade and
g) a pair of pins attached to the insert base and a pair of tracks attached to the casing, the pins and tracks configured to resist efforts to pull the insert completely out of the casing enclosure.

13. A universal insert for installing in a tape measure comprising:
a) a base slidably connectable to a casing of a tape measure through a rule blade aperture;
b) a guide attached to the base and generally parallel to a plurality of graduated markings of a rule blade placed on top of the base and extending from a tape measure, a rule blade being slidable relative to the base when the guide is substantially perpendicular to the base.

14. A universal insert as recited in claim 13, wherein tie base is slightly concave to substantially match the shape of a rule blade.

15. A universal insert as recited in claim 13, further comprising, an indicator connected to the guide enabling at least one of a plurality of graduated markings of a rule blade placed on top of the base to he read.

16. A universal insert as recited in claim 15, further comprising an indicator arm attached to the indicator and extending along the length of the guide.

17. A universal insert as recited in claim 13, further comprising a point at the bottom center of the guide and pointing downward in relation to the base.

18. A universal insert as recited in claim 13, further comprising a point pivotally connected to the insert base.

19. A universal insert as recited in claim 13, wherein the guide is fabricated out of a substantially strong, durable and stiff material.

20. A universal insert for installing in a tape measure comprising:

a) a base slidably connectable to a casing of a tape measure through a rule blade aperture;
b) a guide attached to the base and generally parallel to a plurality of graduated markings of a rule blade placed on top of the base and extendable from a tape measure after being connected, further comprising a catch attached to the insert base, the catch being configured to resist efforts to pull the insert completely out of a casing enclosure of a tape measure.

21. An insert as recited in claim 20, wherein the base, guide, and catch are fabricated out of a single substantially strong and durable material.

22. A tape measure apparatus comprising:
a) a casing having two side walls, a top wall, a bottom wall, a rear wall and a front wall defining an enclosure, the front wall having a blade aperture adjacent the bottom wall;
b) a rule blade having inner and outer end portions and being retractably stored in a coiled condition within said enclosure of the casing, the inner end of the rule blade secured within the enclosure, the outer and of the rule blade protruding through the blade aperture when extended during use;
c) graduated indicia markings along the length of said rule blade, functioning as a measuring scale;
d) an end book attached to the outer end of the rule blade; and
e) an insert that removably fits the casing at the blade aperture, the insert comprising an elongated member with concave aid convex sides that has a width slightly smaller than the maximum width of the aperture, and a length that is at least two times greater than its width, and wherein at least one end portion of the member has an end portion fitting that abuts against an edge of a workpiece to be marked, the end portion fitting comprising first and second sides, the distance between the first and second sides being less than or equal to about the distance between the two side walls, further comprising a catch attached to the elongated member at an end opposing the fitting and resisting efforts to remove completely the insert from the casing.

23. A tape measure apparatus comprising:
a) a casing having two side walls, a top wall, a bottom wall, a rear wall and a front wall,defining an enclosure, the front wall having a blade aperture adjacent the bottom wall;
b) a rule blade having inner and outer end portions and being retractably stored in a coiled condition within, said enclosure of the casing, the inner end of the rule blade secured within the enclosure, the outer end of the rule blade protruding through the blade aperture when extended during use;
c) graduated indicia markings along the length of said rule blade, functioning as a measuring scale;
d) an end hook attached to the outer end of the rule blade; and
e) an insert that removably fits the casing at the blade aperture, the insert comprising an elongated member having a longitudinal axis, the insert further comprising concave and convex sides that has a width slightly smaller than the maximum width of the aperture, and a length that is at least two times greater than its width, and wherein at least one end portion of the member has an end portion fitting that abuts against an edge of a workpiece to be marked, the end portion fitting comprising a front face having a substantially flat surface, wherein the front face is substantially perpendicular to the longitudinal axis, the rule blade being slidable relative to the elongated member when the end portion fitting is substantially perpendicular to the elongated member.

24. A tape measure apparatus as recited in claim 23, further comprising a catch attached to the elongated member at an end opposing the fitting and resisting efforts to remove completely the insert from the casing.

25. A tape measure apparatus as recited in claim 23, further comprising an indicator connected to the fitting enabling at least one of the graduated markings of the rule blade placed on top of the base to be read.

26. A tape measure apparatus as recited in claim 23, further comprising a point at the bottom of the fitting and pointing downward in relation to the elongated member.

27. A tape measure apparatus as recited in claim 23, further comprising a point pivotally connected to the elongated member enabling rotation of the tape measure apparatus about the point.

* * * * *